No. 758,710. PATENTED MAY 3, 1904.
H. SPENCE.
TITANOUS COMPOUND AND PROCESS OF MAKING SAME.
APPLICATION FILED SEPT. 11, 1902.
NO MODEL.
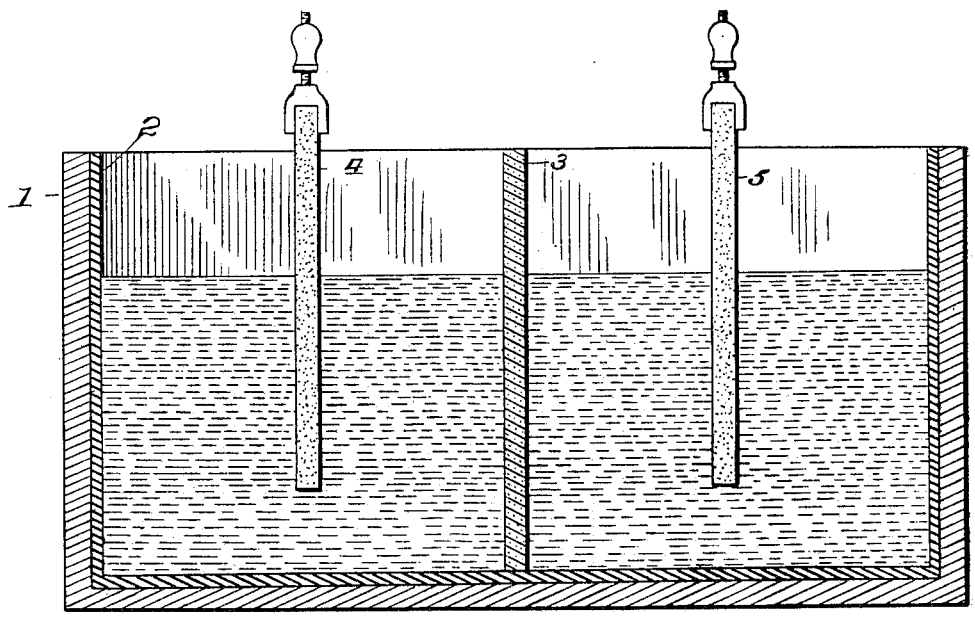

No. 758,710. Patented May 3, 1904.

UNITED STATES PATENT OFFICE.

HOWARD SPENCE, OF MANCHESTER, ENGLAND, ASSIGNOR TO PETER SPENCE & SONS, LIMITED, OF MANCHESTER, ENGLAND.

TITANOUS COMPOUND AND PROCESS OF MAKING SAME.

SPECIFICATION forming part of Letters Patent No. 758,710, dated May 3, 1904.

Application filed September 11, 1902. Serial No. 123,011. (No specimens.)

*To all whom it may concern:*

Be it known that I, HOWARD SPENCE, a subject of the King of Great Britain and Ireland, residing at Manchester, in the county of Lancaster, England, have invented new and useful Improvements in a new Titanous Compound and Method of Making Same, of which the following is a specification.

This invention relates to the manufacture of a new titanous sodium-sulfate compound available for use as a reducing agent in various manufacturing processes, in the discharge of coloring-matters from textile fabrics, and for other purposes.

I have found that if a solution of the double basic compound of titanium sulfate and sodium sulfate, the preparation of which is described in the specification of Letters Patent granted to me No. 670,819, dated the 26th of March, 1901, for "a titanium compound and method of making same," with the addition of sulfuric acid, be subjected to electrolysis the resulting reduced solution contains a new double compound of titanous sulfate (sesquisulfate) and sodium sulfate of the following composition, (after drying *in vacuo:*)

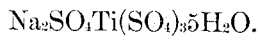

$Na_2SO_4Ti(SO_4)_3 5H_2O.$

In carrying out this invention there is added to a solution of the said basic compound of titanium sulfate and sodium sulfate sufficient sulfuric acid to allow of the formation of titanium sesquisulfate in the liquor. As is well known an excess of sulfuric acid above the theoretical amount is also required to compensate for the $SO_3$, which in the process of electrolysis is transferred by the current from cathode to anode. This addition of sulfuric acid is conveniently effected by diluting the necessary amount of sulfuric acid with water, adding to this dilute solution a proportion of the calculated quantity of the titanium sodium-sulfate crystals and proceeding in the ordinary manner with the electrolysis. The remainder of the salt is added from time to time as the process of reduction proceeds in the electrolytic cell. By this means any desired concentration of solution may readily be obtained.

The solution is prepared (as an example) by dissolving one hundred parts, by weight, of the double basic compound of titanium sulfate and sodium sulfate in water, with the addition of twenty-three parts, by weight, of sulfuric acid, containing sixty-six per cent. of $SO_3$. The amount of water employed is such that the strength of the solution shall after reduction be of about 1.3 specific gravity, or I may alternatively prepare a solution of titanium sulfate by dissolving, for example, one hundred parts of titanium hydrate containing about twenty per cent. of $TiO_2$ in about fifty-three parts of sulfuric acid containing sixty-six per cent. $SO_3$, dilute it to about 1.3 specific gravity and after subjecting it to the above-mentioned electrolysis add to the resulting reduced solution a little more than one molecule of sodium sulfate for every molecule of $Ti_2O_3$ present.

The electrolytic reduction is conveniently carried out in a vessel lined with lead and divided into cathode and anode compartments by a porous diaphragm. The positive and negative electrodes may consist of lead and of carbon, respectively, or both of them may be of lead; but it will be understood that the vessel may be of other suitable material and that other electrodes may be employed. The anode-compartment may contain a solution of sulfuric acid in water.

The accompanying drawing is a longitudinal section of an apparatus for carrying out my process.

The vessel 1 is of any suitable size, shape, and material and may have a lining 2, of lead, if necessary, to protect it from the action of the liquids. It is divided into two compartments by porous diaphragm or partition 3. In one of these compartments is located the anode 4 and in the other compartment the cathode 5.

It is advantageous to have low-current density by exposing a large cathode-reducing surface to the titanium-sulfate liquor.

A current density of about ten to fifteen amperes per square foot of cathode-surface at about four volts gives good results.

The electrolysis is carried out at ordinary or somewhat elevated temperature, between 15° and 30° centigrade being suitable.

The resulting titanous liquor is concentrated by the usual well-known means to effect the separation therefrom of the new compound in the crystallized form. This separation is largely effected by evaporation to a specific gravity of about 1.45. The mother-liquor can be separated from the crystals by centrifugal action or otherwise and should be kept dry, in which condition they are very stable.

If it be desired to obtain a concentrated solution instead of the crystals, the evaporation of the liquor is stopped when the required degree of concentration has been obtained.

The preparation of titanous sodium sulfate from basic titanium sodium sulfate has been described because the basic titanium salt is the most easily and cheaply obtainable source of pure soluble titanic sulfate and in addition contains sodium sulfate; but it is obvious that the same result is obtainable by the electrolysis of titanium sulfate obtained by customary processes, with the addition either before or after such electrolysis of sodium sulfate.

The new titanous sodium sulfate is a powerful reducing agent. The crystals are easily soluble in water and possess a lilac color. The compound is also very suitable for the production of other reduced salts or compounds of titanium. Thus, for example, by means of double decomposition with sodium acetate, either a strong solution of or crystallized titanous acetate may be obtained. Similar reactions with organic and other compounds yield substances capable of industrial application.

What I claim as my invention, and desire to secure by Letters Patent, is—

1. The new compound of titanous sodium sulfate produced from titanium-sulfate compounds by electrolysis, which is of a lilac color, is easily soluble in water, and is a powerful reducing agent.

2. The hereinbefore-described process for the production of a new titanous sodium-sulfate compound which consists in the electrolytic reduction of titanium sulfate in the presence of sulfuric acid, with the addition of sodium sulfate thereto, and in thereafter evaporating the solution thus produced, substantially as set forth.

3. The hereinbefore-described process for the production of a solution of a new titanous sodium sulfate which consists in the electrolytic reduction of titanium sulfate in the presence of sulfuric acid with the addition of sodium sulfate thereto, substantially as set forth.

In testimony whereof I have signed my name to this specification in the presence of two subscribing witnesses.

HOWARD SPENCE.

Witnesses:
WILLIAM E. HAYS,
E. B. JOULE.